US007793679B2

(12) United States Patent
Murphy et al.

(10) Patent No.: US 7,793,679 B2
(45) Date of Patent: Sep. 14, 2010

(54) DRAIN VALVE

(75) Inventors: Mark A. Murphy, Nashville, TN (US);
Edward Hammond, Christiansburg, VA (US)

(73) Assignee: A.O. Smith Corporation, Milwaukee, WI (US)

( * ) Notice: Subject to any disclaimer, the term of this patent is extended or adjusted under 35 U.S.C. 154(b) by 1073 days.

(21) Appl. No.: 11/462,823

(22) Filed: Aug. 7, 2006

(65) Prior Publication Data

US 2007/0034820 A1 Feb. 15, 2007

Related U.S. Application Data

(60) Provisional application No. 60/707,774, filed on Aug. 12, 2005.

(51) Int. Cl.
*F16K 5/00* (2006.01)
(52) U.S. Cl. .............................. 137/15.22; 251/315.11; 251/315.13
(58) Field of Classification Search ............ 251/315.01, 251/315.1, 315.11, 315.3; 137/15.22
See application file for complete search history.

(56) References Cited

U.S. PATENT DOCUMENTS

| 309,247 | A | 12/1884 | Patterson |
| 2,973,182 | A | 2/1961 | Gill |
| 3,073,336 | A | 1/1963 | Johnson |
| 3,093,161 | A | 6/1963 | Jacobson |
| 3,118,650 | A | 1/1964 | Cooper et al. |
| 3,133,723 | A | 5/1964 | Goldman et al. |
| 3,232,579 | A | 2/1966 | Jeffrey |
| 3,334,650 | A | 8/1967 | Lowrey et al. |
| 3,367,359 | A | 2/1968 | Johnson |
| 3,438,387 | A | 4/1969 | Scaramucci |
| 3,490,734 | A | 1/1970 | Freeman |
| 3,501,127 | A | 3/1970 | Freeman |
| 3,522,930 | A | 8/1970 | Richards et al. |
| 3,542,663 | A | 11/1970 | Alewitz |
| 3,552,427 | A | 1/1971 | Jacobson |
| 3,760,836 | A | 9/1973 | Albanese |

(Continued)

FOREIGN PATENT DOCUMENTS

DE 3905241 10/1990

(Continued)

OTHER PUBLICATIONS

Perfection Nipple, Perfection Corporation, Madison, Ohio, publicly available prior to Aug. 12, 2004, as stated in Declaration of Mark A. Murphy dated Dec. 15, 2006, pp. 1-3.

(Continued)

*Primary Examiner*—John K Fristoe, Jr.
(74) *Attorney, Agent, or Firm*—Michael Best & Friedrich LLP

(57) ABSTRACT

A drain valve and method for assembling a drain valve. A valve assembly is inserted into a pipe, and a reduced diameter portion is formed in the pipe to create a substantially watertight seal between a portion of the valve assembly and the pipe. A second reduced diameter portion may be formed in the pipe to provide a thrust bearing surface for resisting sliding movement of the valve assembly within the pipe. A transverse hole is provided in the pipe to provide access to a rotatable mechanism in the valve assembly to permit and restrict fluid flow through the drain valve.

21 Claims, 11 Drawing Sheets

U.S. PATENT DOCUMENTS

| | | | |
|---|---|---|---|
| 3,891,530 A | 6/1975 | Alewitz | |
| 3,948,480 A | 4/1976 | Paptzun et al. | |
| 3,985,152 A | 10/1976 | Albanese | |
| 4,060,472 A | 11/1977 | Alewitz | |
| 4,083,583 A | 4/1978 | Volgstadt et al. | |
| 4,172,583 A | 10/1979 | Wrasman | |
| 4,176,689 A | 12/1979 | Wrasman | |
| 4,184,507 A | 1/1980 | Richards | |
| 4,280,526 A | 7/1981 | Gonzalez | |
| 4,467,823 A | 8/1984 | Shaffer et al. | |
| 4,480,813 A | 11/1984 | Holley | |
| 4,545,564 A | 10/1985 | Krosoczka et al. | |
| 4,546,790 A | 10/1985 | Huber et al. | |
| 4,696,323 A | 9/1987 | Iff | |
| 4,793,638 A | 12/1988 | Baldwin, Jr. | |
| 4,844,413 A | 7/1989 | Weber et al. | |
| 5,277,171 A | 1/1994 | Lannes | |
| 5,406,935 A | 4/1995 | Cinotto | |
| 5,586,749 A | 12/1996 | Conley et al. | |
| 5,890,286 A | 4/1999 | Eklöf | |
| 6,474,363 B1 | 11/2002 | Stephenson | |
| 6,629,683 B2 * | 10/2003 | Wang | 251/315.1 |
| 6,916,011 B2 | 7/2005 | Kitazawa et al. | |
| 6,923,429 B2 * | 8/2005 | Merrill et al. | 251/176 |
| 2003/0001125 A1 | 1/2003 | Kitazawa et al. | |

FOREIGN PATENT DOCUMENTS

| | | |
|---|---|---|
| GB | 1217117 | 12/1970 |
| JP | 60129476 | 7/1985 |
| JP | 62165081 | 7/1987 |

OTHER PUBLICATIONS

Weingarten, Larry and Suzanne, The Water Heater Workbook, 1992, pp. 25-27, 48-53, 7th Printing, Elemental Enterprises, Monterey, California.

* cited by examiner

DRAIN VALVE

This application claims priority under 35 U.S.C. §119 to U.S. Provisional Application No. 60/707,774, filed Aug. 12, 2005.

BACKGROUND

The present invention relates to a drain valve and a method for assembling a drain valve.

SUMMARY

In one embodiment, the invention provides a method for assembling a drain valve, the method comprising: (a) providing a metal pipe that includes first and second opposite ends, a pipe bore extending from the first end to the second end, and a transverse hole extending through a side of the metal pipe and communicating with the pipe bore; (b) providing a valve assembly comprising a body having a body bore, and a rotatable mechanism within the body and having a mechanism bore and means for rotating the rotatable mechanism, the rotatable mechanism being rotatable via the means for rotating within the body to selectively align and misalign the mechanism bore with respect to the body bore; (c) inserting the valve assembly into the pipe bore with the means for rotating being accessible through the transverse hole; and (d) forming a first reduced diameter portion in the pipe bore to create a substantially water-tight seal between a portion of the valve assembly and the first reduced diameter portion.

In some embodiments, the method may further comprise (e) forming a second reduced diameter portion to provide a thrust bearing surface to resist sliding movement of the valve assembly toward the second end of the pipe. In some embodiments, the drain valve may be incorporated into a water heater by threading the first end of the drain valve into a threaded drain hole in a water tank of the water heater.

In other embodiments, the invention provides a drain valve comprising: a pipe including a cylindrical pipe wall having interior and exterior surfaces and first and second opposite ends, the interior surface of the pipe wall defining a pipe bore extending between the first and second ends, and a transverse hole in the pipe wall extending from the exterior surface to the interior surface and communicating with the pipe bore; and a valve assembly within the pipe bore, the valve assembly comprising a body and a rotatable mechanism within the body, the body defining a body bore and the rotatable mechanism defining a mechanism bore, the rotatable mechanism being rotatable to selectively align and misalign the mechanism bore with respect to the body bore; wherein the rotatable mechanism is aligned with the transverse hole in the pipe to enable rotating of the rotatable mechanism through the transverse hole; and wherein the pipe bore includes a first reduced diameter portion applying a compressive force against a portion of the valve body to create a water-tight seal therebetween.

In some embodiments, the drain valve may include a seal member mounted on and rotatable with the rotatable mechanism.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
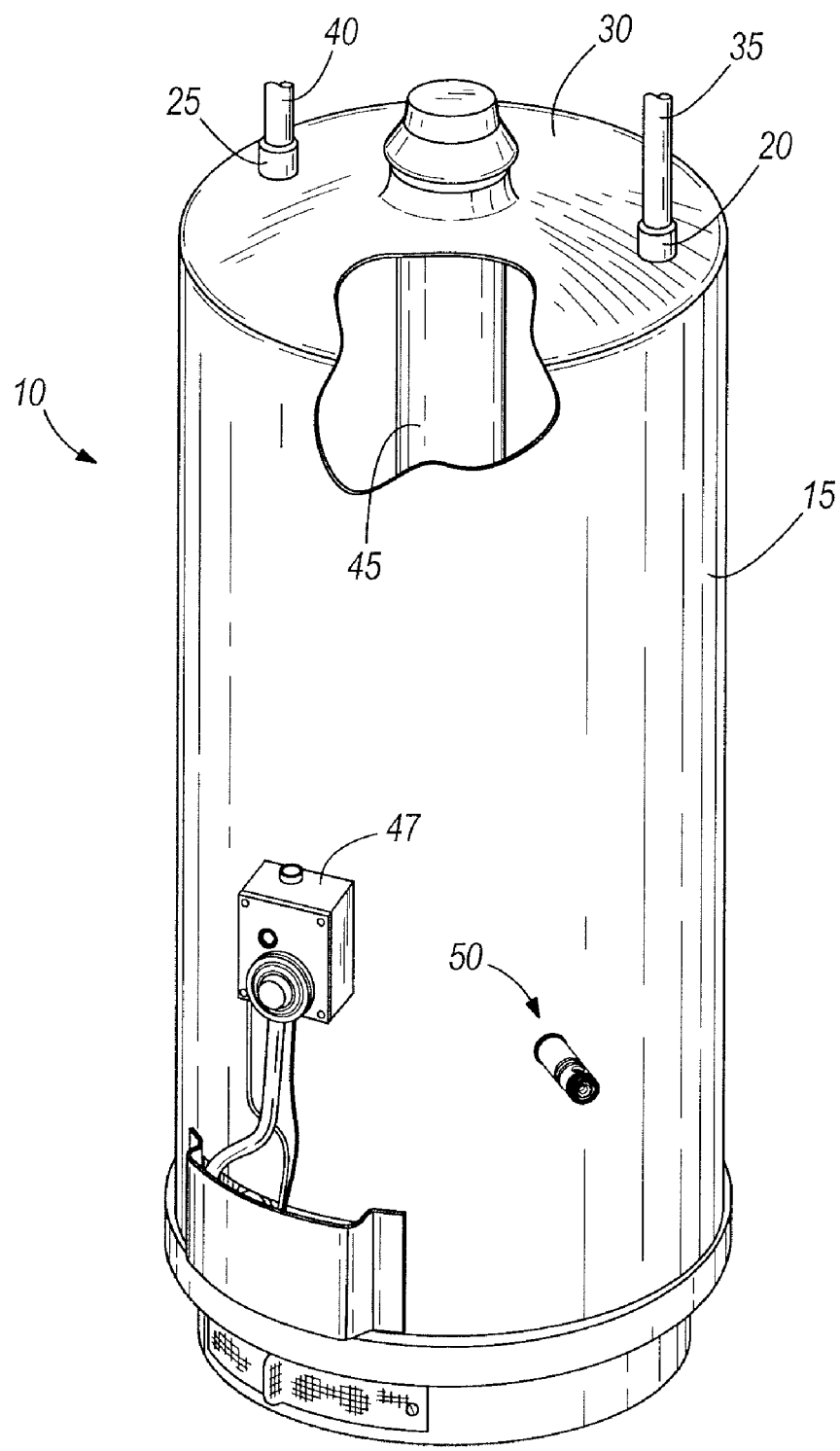
FIG. 1 is a perspective view of a water heater including a drain valve according to the present invention.

FIG. 1 illustrates a water heater 10 that includes a tank 15 adapted to contain water to be heated. Inlet and outlet spuds 20, 25 are mounted to a top head 30 of the tank 15 around holes in the top head 30. The spuds 20, 25 are adapted to interconnect with respective cold and hot water pipes 35, 40 of the building in which the water heater 10 is situated. The illustrated water heater 10 is a gas-fired water heater, which includes a combustion chamber under the tank 15 and a flue 45 extending through the center of the tank 15 between the combustion chamber and the top head 30. A gas supply valve 47 controls the flow of gas fuel to a burner within the combustion chamber, where the gas fuel and combustion air are combined and burned to create hot products of combustion. The products of combustion flow under natural convection up through the flue 45 where they are exhausted. Heat from the products of combustion is transferred through the flue 45 to the water in the tank 15. The water heater 10 also includes a drain valve 50 communicating with the interior space of the tank 15 through a lower part of the tank 15 to permit draining of water from the tank 15.

The illustrated water heater 10 is referred to in the art as a natural draft, gas-fired, storage-type water heater. Despite this, the present invention is not limited in application to this type of water heater. The present invention may be used in substantially any application involving a storage tank from which it may be desirable to drain liquid from time-to-time. One example such an application is a power-vent, gas-fired, storage-type water heater in which a blower is used to assist the flow of products of combustion up through the flue 45. Another example is an electric storage-type water heater in which electric heating coils are used to heat the water in the tank 15, thereby removing the need for a combustion chamber and flue 45. Other examples include substantially any tanks that require a drain for draining water or another liquid from a tank, without regard to whether the tank is used in a water heater or some other application.

Figure 2:
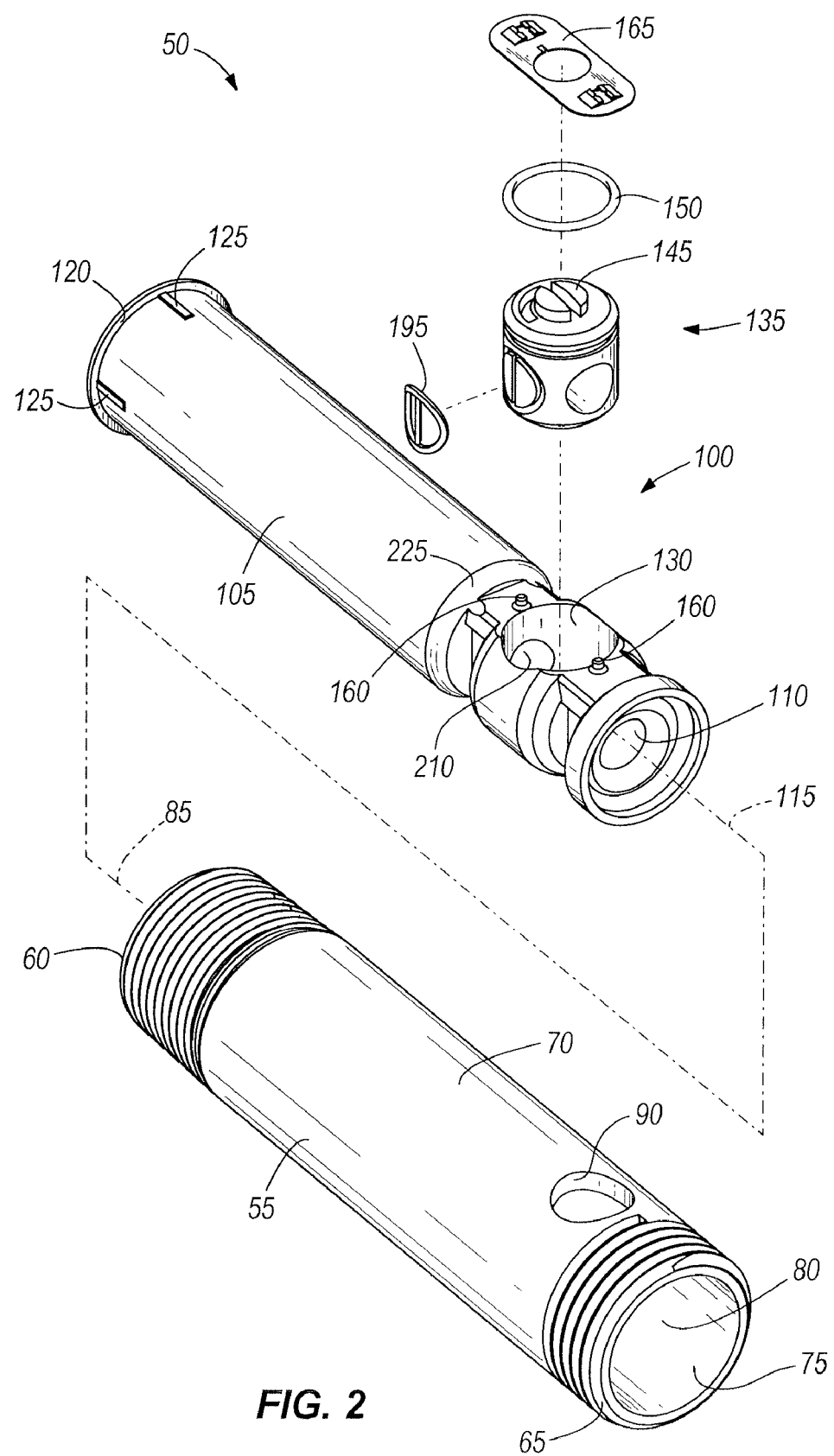
FIG. 2 is an exploded view of a first embodiment of the drain valve.

FIG. 2 illustrates the parts of a first embodiment of the drain valve 50. In this embodiment, the drain valve 50 includes a metal pipe, which in the illustrated embodiment is a pipe nipple 55 having first and second male threaded ends 60, 65. The pipe nipple 55 may be constructed of steel, plastic, or another suitable metal. The pipe nipple 55 includes a generally cylindrical pipe wall having outer and inner surfaces 70, 75. The inner surface 75 defines a pipe bore 80 extending between the first and second ends 60, 65. The pipe bore 80 is generally cylindrical and is characterized by a pipe longitudinal axis 85. The first threaded end 60 includes tapered pipe threads, and the second threaded end 65 includes standard hose threads. The first threaded end 60 is adapted to be threaded into a female spud or hole in the tank 15. The pipe threads ensure that a secure, water-tight interconnection between the pipe nipple 55 and the tank 15 is achieved. The second threads are adapted to have a standard hose threaded onto the second end 65 of the pipe nipple 55 to facilitate draining the tank 15. Extending through the pipe wall is a transverse hole 90.

FIG. 2 also illustrates a first embodiment of a modular valve assembly 100 adapted to be inserted into the pipe bore 80. The valve assembly 100 includes a tubular body 105 defining a body bore 110 having a longitudinal body axis 115. The tubular body 105 is constructed of an electrically non-conductive material, such as cross-linked polyethylene. When inserted into the pipe bore 80, the tubular body 105 lines the inner surface 75 of the pipe nipple 55 and acts as a dielectric between the pipe nipple 55 and the water in the tank 15 to reduce or prevent corrosion of the tank 15, pipe nipple 55, and any sacrificial anode within the water heater 10. To further reduce or eliminate corrosion of the tank 15, pipe nipple 55, and anode, the body 105 includes a flared end 120 that is positioned outside of the pipe bore 80 and covers the distal portion of the first end 60 of the pipe nipple 55. Ribs 125 extend longitudinally along the outer surface of the tubular body 105 next to the flared end 120. The ribs 125 create a press-fit interconnection between the tubular body 105 and the pipe nipple 55. The body 105 includes an opening 130 into which a rotatable mechanism is 135 received. In alternative constructions and embodiments, the valve assembly 100 may include a metal (e.g., brass) tubular body 105.

Figure 3:
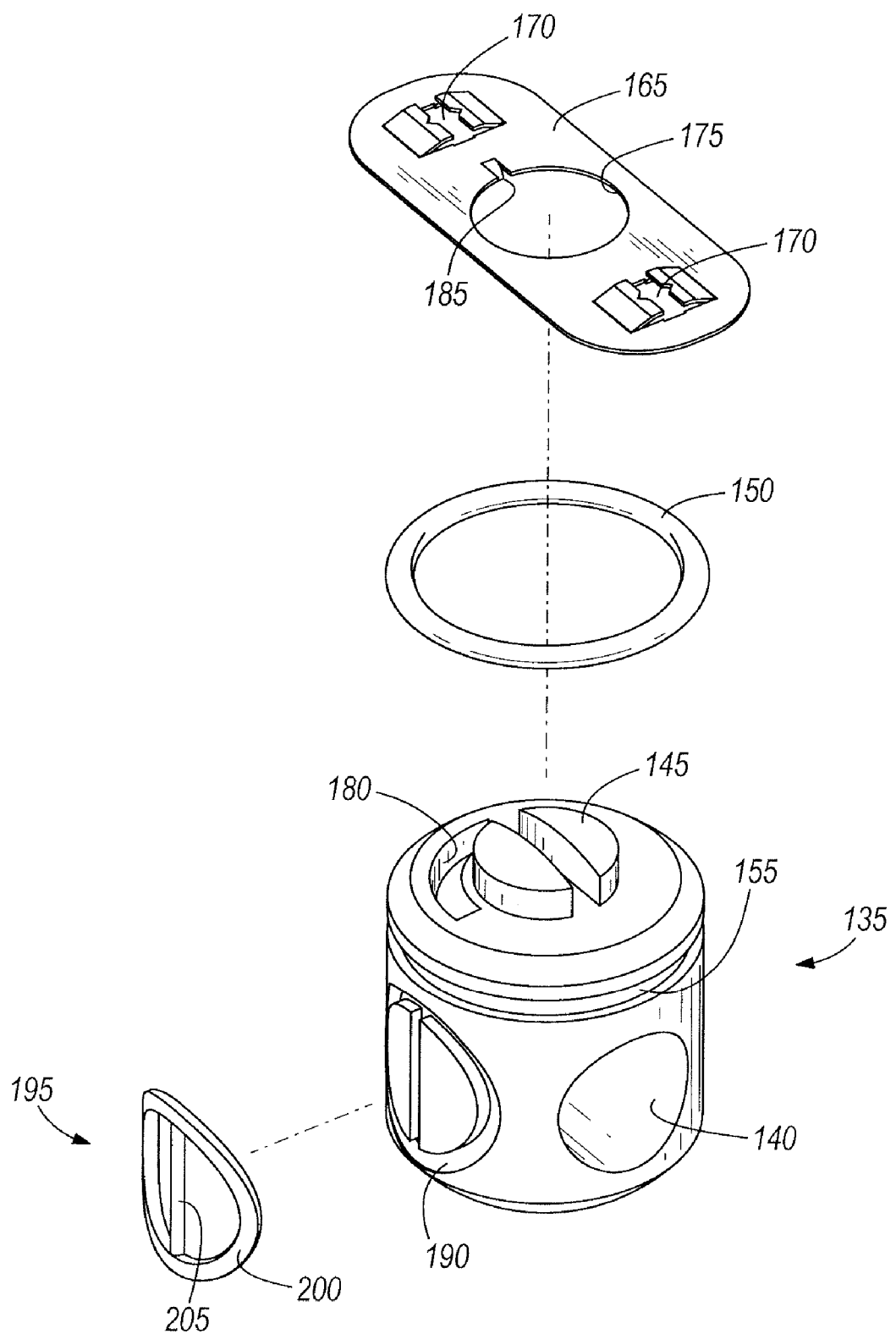
FIG. 3 is an exploded view of a rotatable mechanism of the first embodiment.

With additional reference to FIG. 3, the rotatable mechanism 135 includes a mechanism bore 140 extending through it. The mechanism bore 140 can be aligned or misaligned with the body bore 110 to permit or restrict, respectively, flow of fluid through the body bore 110. The mechanism 135 includes a slotted head 145 to facilitate such rotation with a tool (e.g., a flat-head screwdriver). In other embodiments, the mechanism 135 may have other depressions and protrusions instead of the illustrated slot so that other types of torque transmitting tools (e.g., Phillips head screwdrivers and socket drivers) may be used to rotate the mechanism 135. A gland seal 150 fits into a recess 155 at the top of the mechanism 135 to prevent water from leaking around the sides of the mechanism 135 and up through the transverse hole 90 in the pipe nipple 55.

The body 105 includes a pair of retaining posts 160, one on either side of the opening 130. A retaining member 165 includes a pair of holes 170 with flexible fingers that pinch against the two posts 160, and includes a hole 175 through which the slotted head 145 extends. The retaining member 165 extends across the top of the mechanism 135 to retain it within the hole 175. A top surface of the rotatable mechanism 135 includes an arcuate slot 180. A tab 185 adjacent the hole 175 in the retaining member 165 is bent down and received in the arcuate slot 180. The arcuate slot 180 has an arc length of 90° in the illustrated embodiment and is oriented such that when the tab 185 abuts one end of the slot 180, the mechanism bore 140 is aligned with the body bore 110, and when the tab 185 abuts the other end of the slot 180, the mechanism bore 140 is perpendicular to the body bore 110. This gives the operator a positive stop at each end of the range of motion and facilitates quick actuation between the "entirely open" position when the bores 110, 140 are parallel to each other, and the "entirely closed" position when the bores 110, 140 are perpendicular to each other.

Formed in one side of the rotatable mechanism 135 is a recess 190 into which a seal 195 may be inserted. The seal 195 includes a ring 200 and a cross-member 205 extending generally diagonally across the ring 200. The seal 195 is manufactured in a non-planar, curved shape that matches the shape of the outer surface of the mechanism 135. The ring 200 and cross-member 205 are integrally formed with each other in the illustrated embodiment, and are constructed of rubber, plastic, or another resilient material suitable for sealing. The recess 190 in the mechanism 135 includes portions that match the shape of the ring 200 and cross-member 205 of the seal 195, such that the seal 195 fits snugly within the recess 190. The surface of the seal 195 that faces away from the mechanism 135 is slightly raised with respect to the outer surface of the mechanism 135. The seal 195 rotates with the mechanism 135. Because the shape of the seal 195 follows the contour of the mechanism 135, it is less likely to catch on an edge of the opening 210 (see FIG. 2) of the body bore 110 during such rotation. When the mechanism 135 is rotated to position the mechanism bore 140 perpendicular to the body bore 110, the ring 200 of the seal 195 is positioned in contact with the body material around the opening 210 to the body bore 110 to resist or prevent water from migrating around the outside of the mechanism 135. In the illustrated embodiment, the seal 195 is used to seal the portion of the body bore 110 extending between the flared end 120 and the hole 130.

Figure 4:
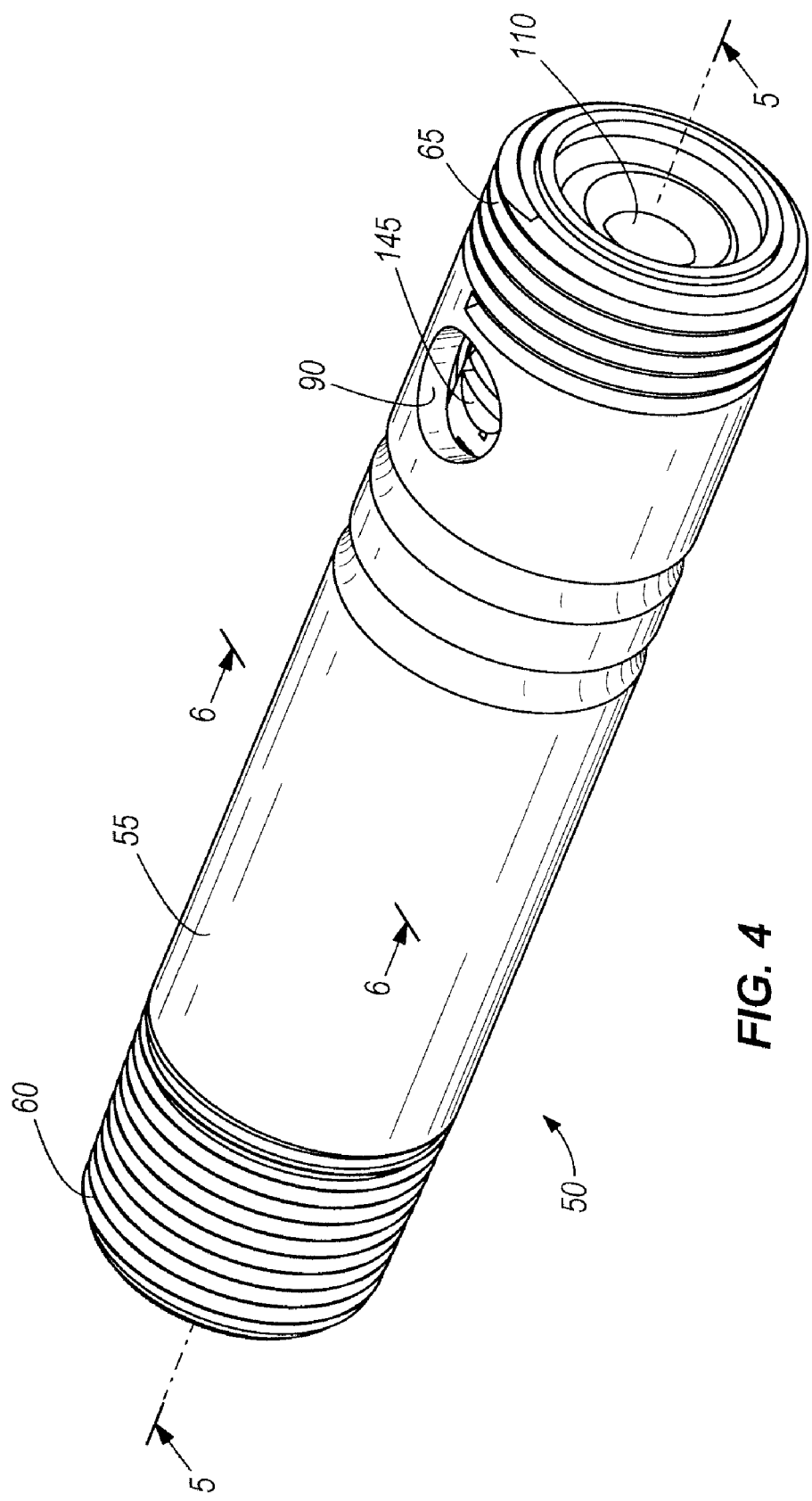
FIG. 4 is perspective view of the assembled drain valve of the first embodiment.
Figure 5:
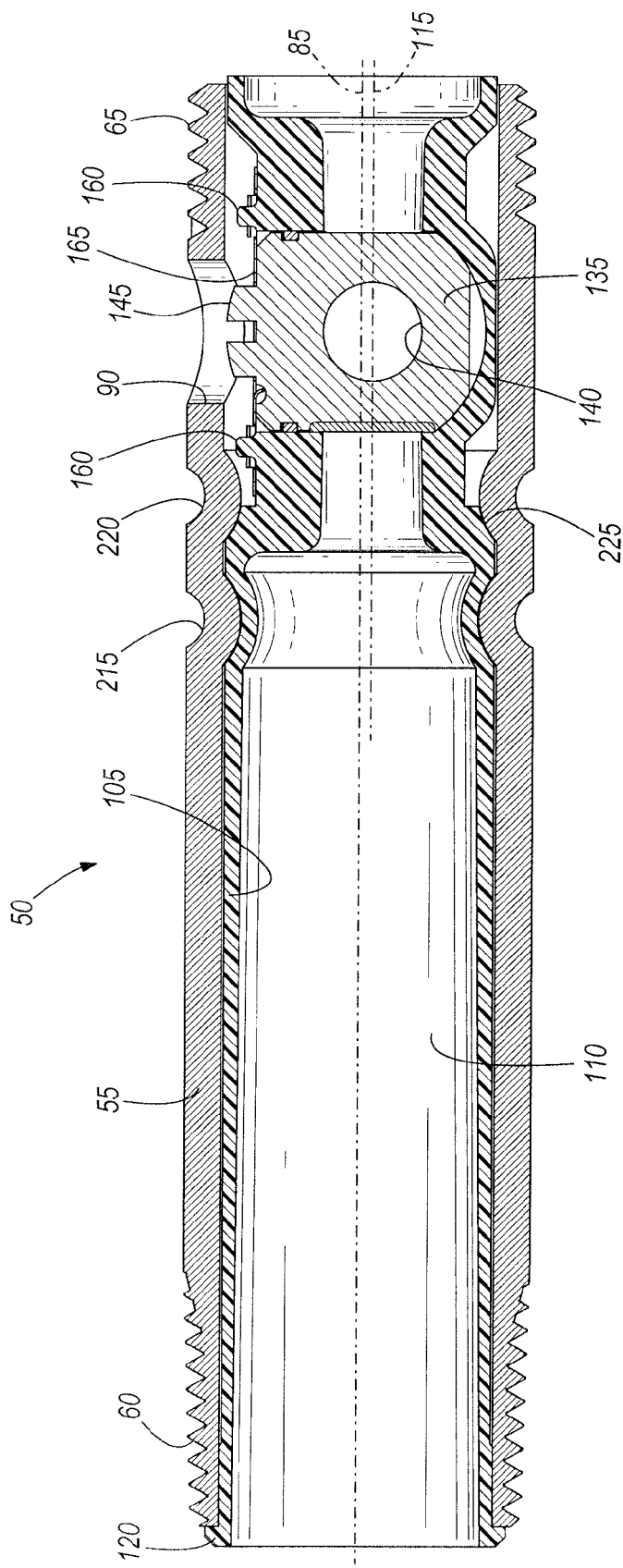
FIG. 5 is a cross-sectional view taken along line 5-5 in FIG. 4.
Figure 6:
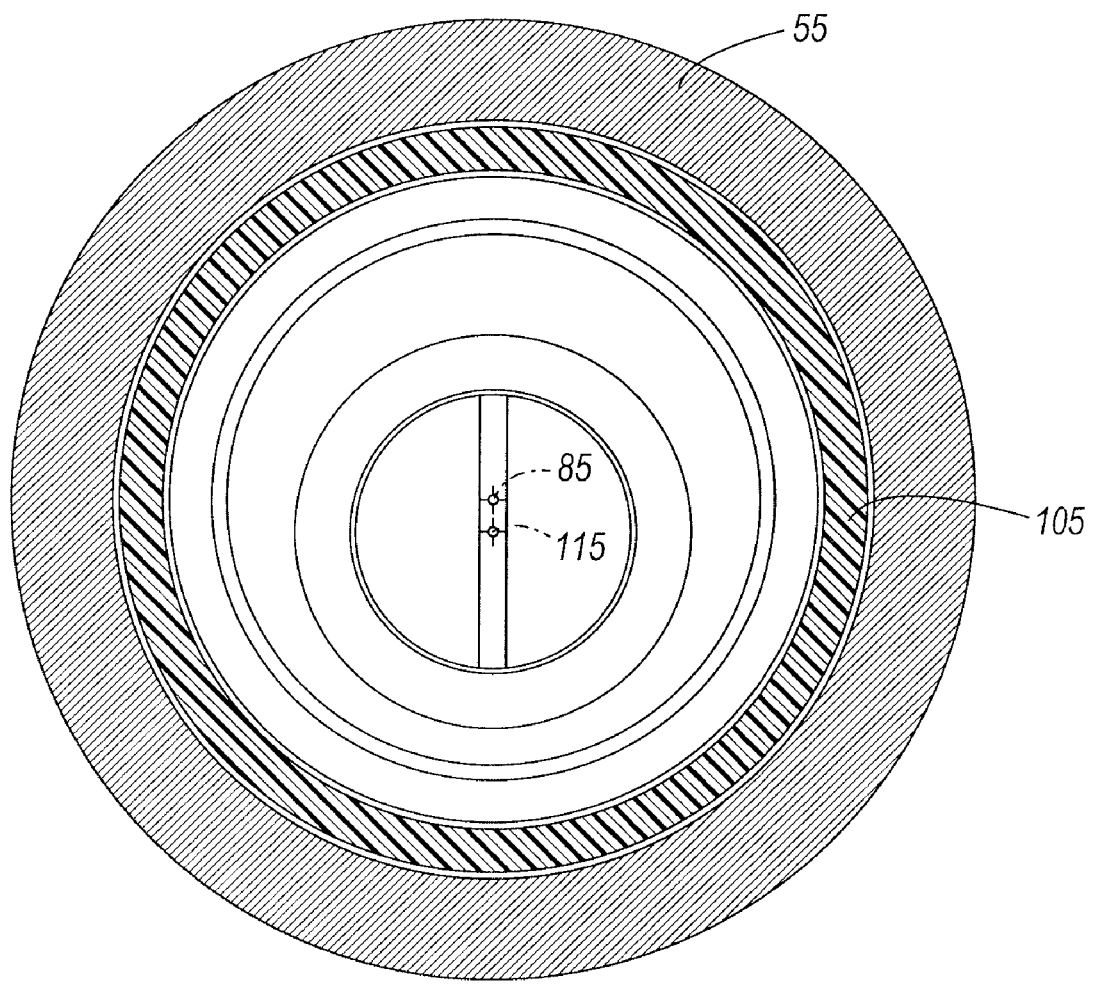
FIG. 6 is a cross-sectional view taken along line 6-6 in FIG. 4.

FIGS. 4-6 illustrate the first embodiment assembled. The process for assembling includes inserting the modular valve assembly 100 into the pipe bore 80 from the first end 60 of the pipe nipple 55. The distance between the first end 60 of the pipe nipple 55 and the transverse hole 90 is equal to the distance between the flared end 120 of the body 105 and the slot head 145 of the mechanism 135. Consequently, the slot head 145 is aligned longitudinally with the transverse hole 90 when the flared end 120 of the body 105 is in contact with the first end 60 of the pipe nipple 55. To radially align the slot head 145 with the transverse hole 90, the body bore 110 is eccentric with respect to the longitudinal axis of the body 105. Consequently, when the body 105 is inserted into the pipe nipple 55, the longitudinal axes 85, 115 of the pipe nipple 55 and body 105 are not collinear. An assembly fixture may be used to position the longitudinal axes 85, 115 with respect to each other in a selected arrangement that also aligns the slotted head 145 of the rotatable mechanism 135 with the transverse hole 90 in the pipe nipple 55. To facilitate inserting the valve assembly 100 in to the pipe bore 80, the slotted head 145 has a low profile that it is within the envelope of the inner surface 75 of the pipe nipple 55 and does not extend up into the transverse hole 90.

Once the valve assembly 100 is inserted into the pipe bore 80, and is held in place by the press-fit connection between the ribs 125 and the inner surface 75 of the pipe nipple 55, first and second rings or reduced diameter portions 215, 220 are formed into the outer surface 70 of the pipe nipple 55, which causes the inner surface 75 of the pipe nipple 55 to be deformed inwardly. This reduces the diameter of the pipe bore 80 and abuts the inner surface 75 of the pipe nipple 55 against the tubular body 105 of the valve assembly 100. The second reduced diameter portion 220 is positioned to abut against a thrust surface 225 (see FIG. 2) of the tubular body 105, to resist longitudinal movement of the valve assembly 100 toward the second end 65 of the pipe nipple 55. In this regard, the second reduced diameter portion 220 provides a thrust bearing surface. The first reduced diameter portion 215 squeezes against and deflects a portion of the tubular body 105 to securely hold the tubular body 105 within the pipe bore 80 and form a water-tight seal between the pipe nipple 55 and the valve body 105 around the entire circumference of the valve body 105. To improve the quality of the seal, a wipe-on sealant (e.g., an organic mastic) may be applied around the valve body 105 in the region under the first reduced diameter portion 215. Such wipe-on sealant fills any small inconsistencies between the nipple 55 and valve body 105 to raise the likelihood of achieving a water-tight seal. The rings 215, 220 may be formed simultaneously with one operation or may be formed in separate steps of the manufacturing process.

The valve assembly 100 is referred to above as "modular" because it is a subassembly that defines an operable valve. The valve body 105 supports the rotatable mechanism 135 for rotation, and the seals 150, 195 provide substantially water-tightly seal between the rotatable mechanism and the valve body 105. Thus the modular valve assembly 100 is operable on its own (i.e., without being inserted into the pipe nipple 55) to permit and restrict fluid flow through the body bore 110 in response to rotation of the rotatable mechanism 135.

Figure 7:
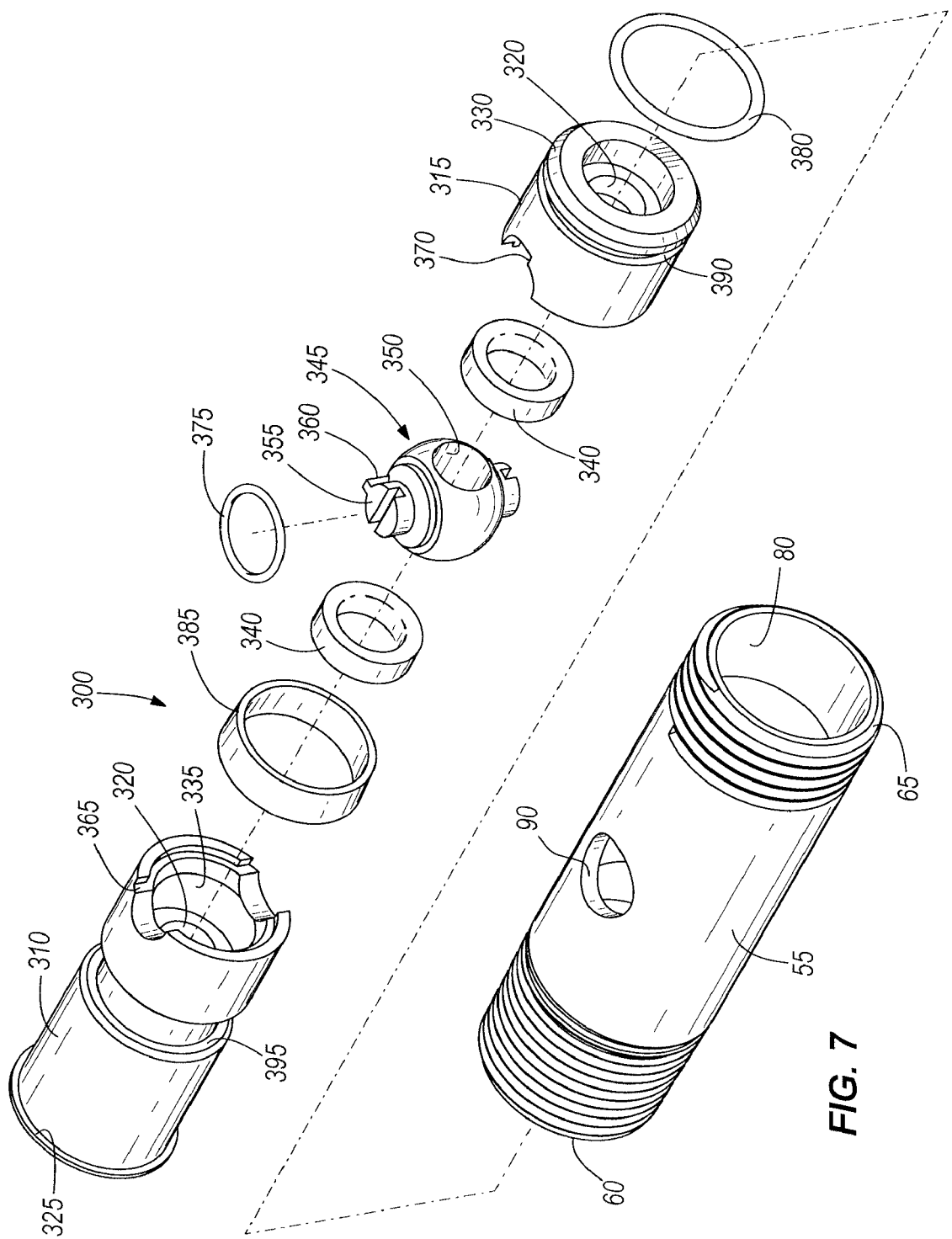
FIG. 7 is an exploded view of a second embodiment of the drain valve.
Figure 8:
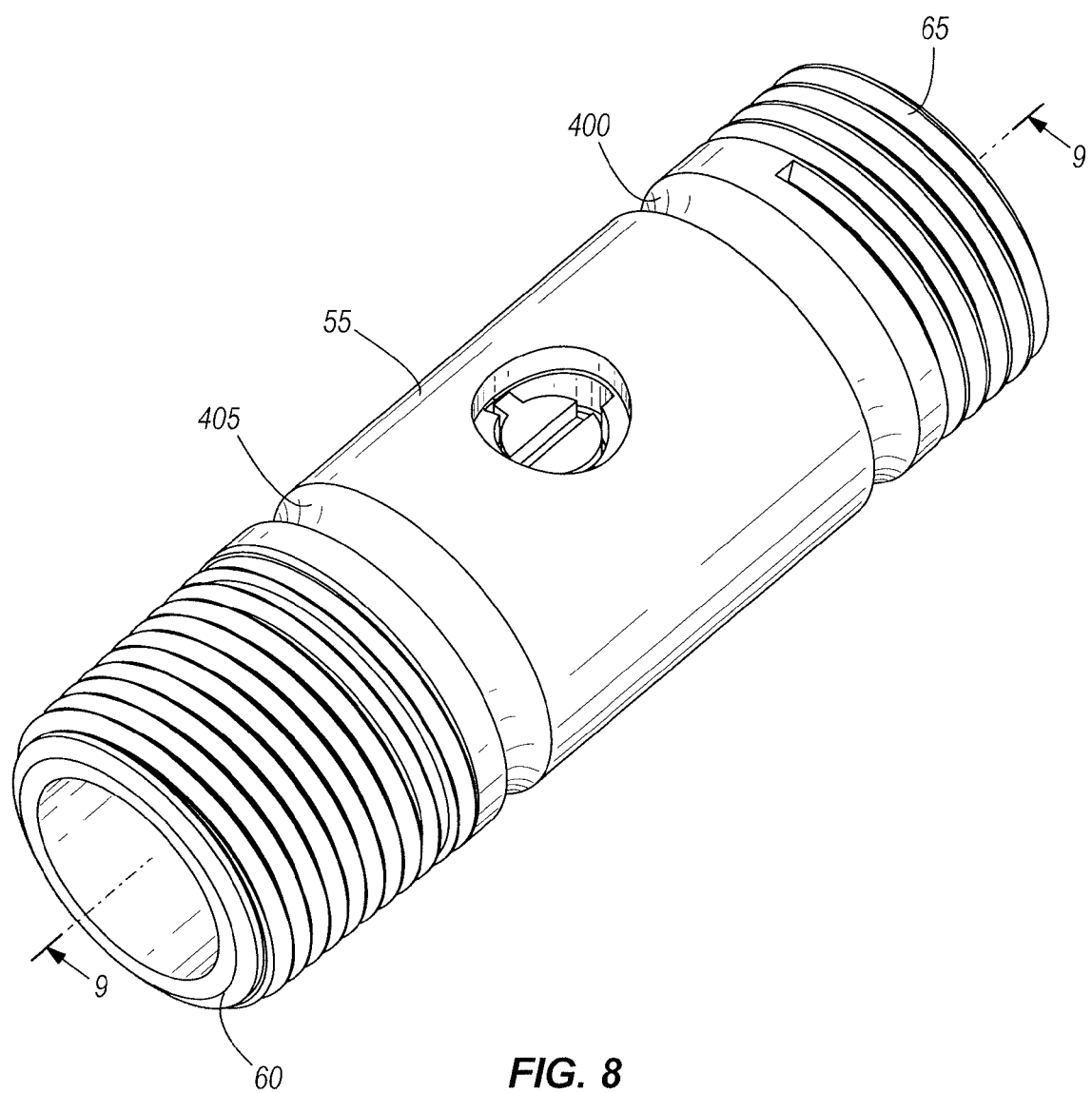
FIG. 8 is a perspective view of the assembled drain valve of the second embodiment.
Figure 9:
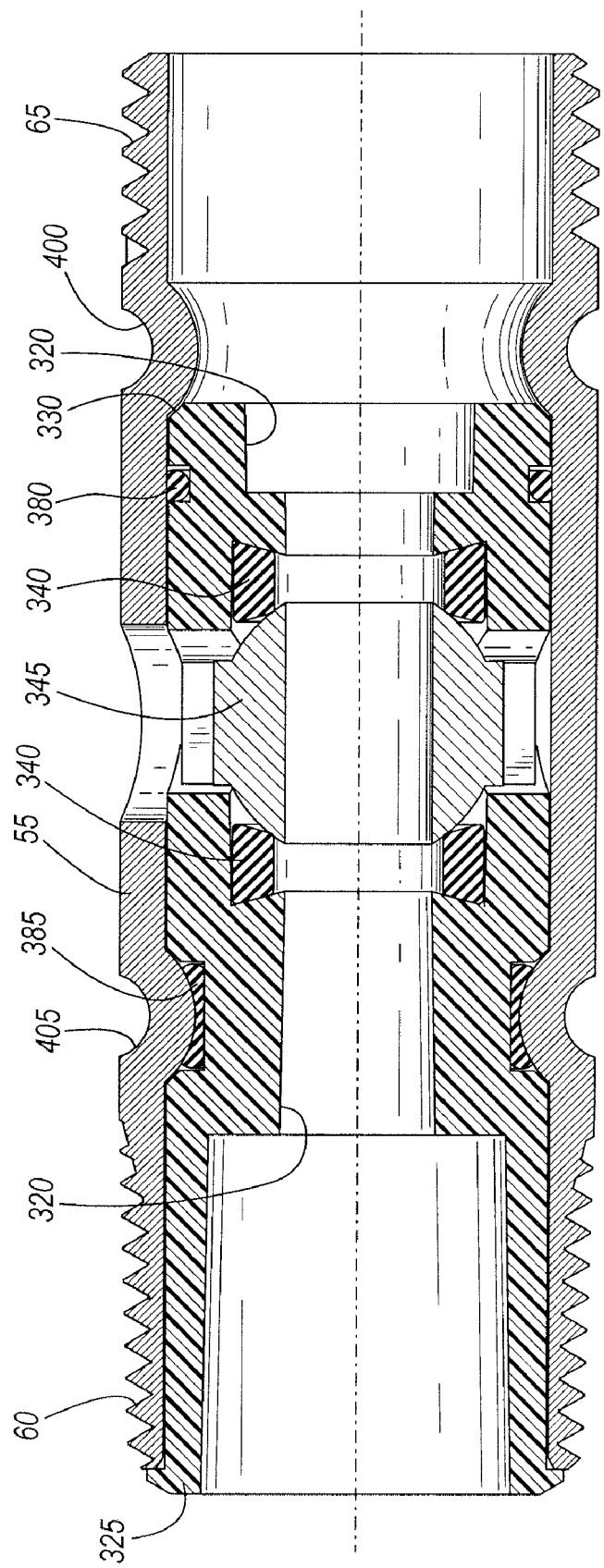
FIG. 9 is a cross-sectional view taken along line 9-9 in FIG. 8.

FIGS. 7-9 illustrate a second embodiment of the invention. The pipe nipple in this embodiment is the same as the pipe nipple 55 of the first embodiment. The valve assembly 300 in this embodiment includes a body have first and second pieces 310, 315, each having bores 320 which together define a body bore. The first body piece 310 includes a flared end 325 which abuts the first end 60 of the pipe nipple 55 as in the first embodiment. The second body piece 315 includes a beveled edge 330, which provides a thrust bearing surface for the valve assembly 300.

Each piece 310, 315 also has a counter bore 335 that receives a seat 340 for a rotatable mechanism 345. The rotatable mechanism 345 is trapped between the seats 340 and the two pieces 310, 315, and includes a mechanism bore 350 that is rotated into and out of alignment with the body bore 320 by way of a slotted head 355. A spur 360 on the slotted head 355 moves within a slot defined when the two body pieces 310, 315 come together. When the spur 360 abuts a first end 365 of the slot, the mechanism bore 350 aligned with the body bore 320, and when the spur 360 abuts a second end 370 of the slot, the mechanism bore 320 is perpendicular to the body bore 320. A gland seal 375 is used to resist water flow around the rotatable mechanism 345 and up through the transverse hole 90 in the pipe nipple 55. An o-ring 380 and an external seal 385 fit within respective grooves 390, 395 in the outer surface of the valve body and seal against the inner surface of the pipe nipple 55. As with the first embodiment, a wipe-on sealant may be used to improve these seals.

With reference to FIGS. 8 and 9, this embodiment is assembled by first creating a ring or reduced diameter portion 400 in the pipe nipple 55 to create a reduced diameter portion of the pipe bore 80 near the second end 65 of the pipe nipple 55. This reduced diameter portion provides a thrust bearing surface within the pipe bore 80. Then the valve assembly 300 is inserted through the first end of 60 the pipe nipple 55, which brings the thrust bearing surface 330 of the second piece 315 of the body into abutment with the reduced diameter portion 400. Once the valve assembly 300 is inserted into the pipe bore 80 and the slotted head 355 of the rotatable mechanism 345 is aligned with the transverse hole 90 in the pipe nipple 55, a second depression 405 is created in the pipe nipple 55 to create a reduced diameter portion of the pipe bore 80 around the external seal 385 on the first body piece 310 of the valve assembly 300 to trap the valve assembly 300 within the pipe bore 80. This second depression 405 creates a water-tight seal between the pipe nipple 55 and the valve body around the entire circumference of the first body piece 310.

Figure 10:
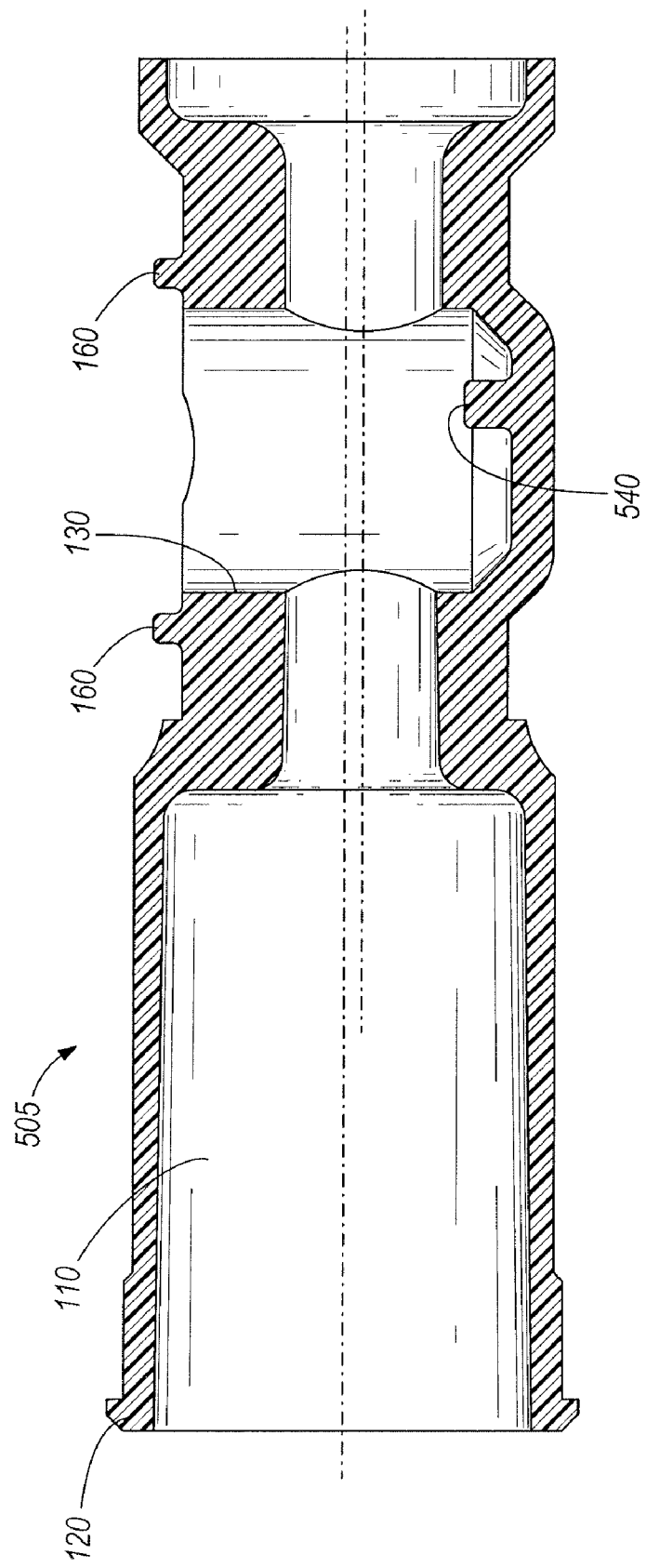
FIG. 10 is a cross-sectional view of an alternative drain valve insert.
Figure 11:
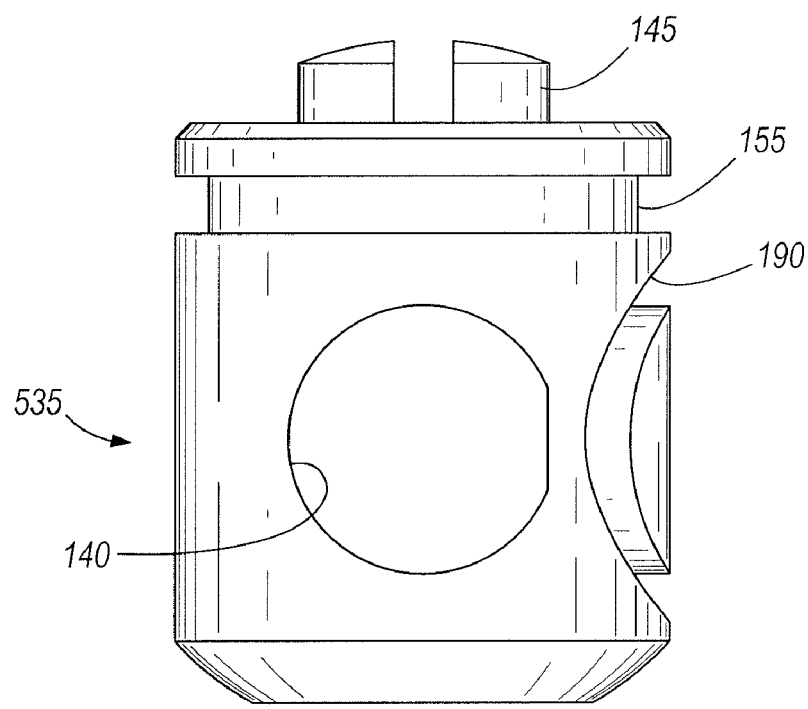
FIG. 11 is a side view of an alternative rotatable mechanism for use in the drain valve insert of FIG. 10.
Figure 12:
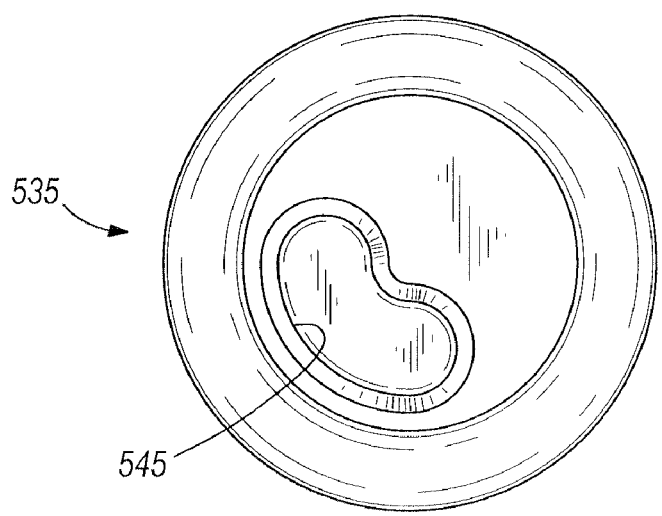
FIG. 12 is a bottom view of the alternative rotatable mechanism of FIG. 11.

A third embodiment of a single-piece tubular body 505 and rotatable mechanism 535 for use within the modular valve assembly of the present invention is illustrated in FIGS. 10-12. This tubular body 505 is similar in all respects to the tubular body 105 of the first embodiment (and thus the same reference numerals are used), except for a post 540 molded in the opening 130. The rotatable mechanism 535 of this embodiment is similar in all respects to the rotatable mechanism 135 of the first embodiment, except that it includes a slot 545 in its bottom surface instead of the slot 180 on the top surface of the rotatable mechanism 135 of the first embodiment. The post 540 is received within the slot 545. The mechanism bore 140 is aligned with and perpendicular to the body bore 110 when the rotatable mechanism 535 is rotated to bring the post 540 into abutment with the respective opposite ends of the slot 545. This embodiment employs a retaining member 165 identical to that used in the first embodiment, except that there is no need for the tab 185 in this embodiment.

Aspects of each illustrated embodiments can be used in the other embodiment. For example, the thrust bearing surface position and arrangement in each embodiment can be applied to the other embodiment. Also the external seal 385 of the second embodiment can be used in the first and third embodiments. Also, the non-collinear longitudinal axes of the pipe bore and body bore can be used in the second embodiment as well as in the first and third embodiments to facilitate assembly.

Various features and advantages of the invention are set forth in the following claims.

The invention claimed is:

1. A method for assembling a drain valve, the method comprising:
    (a) providing a pipe that includes first and second opposite ends, a pipe bore extending from the first end to the second end, and a transverse hole extending through a side of the pipe and communicating with the pipe bore;
    (b) providing a valve assembly comprising a body having a body bore, and a rotatable mechanism within the body and having a mechanism bore and means for rotating the rotatable mechanism, the rotatable mechanism being rotatable via the means for rotating within the body to selectively align and misalign the mechanism bore with respect to the body bore;

(c) inserting the valve assembly into the pipe bore with the means for rotating being accessible through the transverse hole; and (d) forming a first reduced diameter portion in the pipe bore to create a substantially water-tight seal between a portion of the valve assembly and the first reduced diameter portion; and (e) forming a second reduced diameter portion to provide a thrust bearing surface to resist sliding movement of the valve assembly toward the second end of the pipe;

wherein step (e) is performed prior to step (c); and wherein step (c) includes abutting the valve assembly against the second reduced diameter portion in the pipe bore prior to step (d).

2. A method for assembling a drain valve, the method comprising:

(a) providing a pipe that includes first and second opposite ends, a pipe bore extending from the first end to the second end, and a transverse hole extending through a side of the pipe and communicating with the pipe bore;

(b) providing a valve assembly comprising a body having a body bore, and a rotatable mechanism within the body and having a mechanism bore and means for rotating the rotatable mechanism, the rotatable mechanism being rotatable via the means for rotating within the body to selectively align and misalign the mechanism bore with respect to the body bore;

(c) inserting the valve assembly into the pipe bore with the means for rotating being accessible through the transverse hole; and (d) forming a first reduced diameter portion in the pipe bore to create a substantially water-tight seal between a portion of the valve assembly and the first reduced diameter portion;

wherein step (a) includes defining a longitudinal central axis of the pipe bore; wherein step (b) includes defining a longitudinal central axis of the body bore; and wherein step (c) includes positioning the longitudinal central axis of the body bore in a selected position in which the means for rotating is accessible through the transverse hole and in which the longitudinal central axis of the body bore is not collinear with the longitudinal central axis of the pipe bore.

3. The method of claim 2, wherein step (d) includes applying a compressive force to an external surface of the pipe to deflect a portion of the pipe material inwardly to create the reduced diameter portion.

4. The method of claim 2, further comprising (e) forming a second reduced diameter portion to provide a thrust bearing surface to resist sliding movement of the valve assembly toward the second end of the pipe.

5. The method of claim 2, wherein step (b) includes providing a sealing member around a portion of the valve body; and wherein step (d) includes creating a substantially water-tight seal between the first reduced diameter portion of the pipe bore and the sealing member.

6. The method of claim 2, wherein step (c) further comprises mounting the pipe and valve assembly in an assembly fixture that automatically positions the longitudinal central axis of the body bore in the selected position upon insertion of the valve assembly in the pipe.

7. The method of claim 2, wherein step (a) includes constructing the pipe of a metal materials, and wherein step (b) includes constructing the valve body of a dielectric material.

8. The method of claim 2, further comprising applying a sealant around a portion of an outside surface of the valve body, and wherein step (d) includes forming the first reduced diameter portion against the portion of the valve body to which the sealant is applied.

9. A method for assembling a drain valve, the method comprising:

(a) providing a pipe that includes first and second opposite ends, a pipe bore extending from the first end to the second end, and a transverse hole extending through a side of the pipe and communicating with the pipe bore;

(b) providing a valve assembly comprising a body having a body bore, and a rotatable mechanism within the body and having a mechanism bore and means for rotating the rotatable mechanism, the rotatable mechanism being rotatable via the means for rotating within the body to selectively align and misalign the mechanism bore with respect to the body bore;

(c) inserting the valve assembly into the pipe bore with the means for rotating being accessible through the transverse hole; and (d) forming a first reduced diameter portion in the pipe bore to create a substantially water-tight seal between a portion of the valve assembly and the first reduced diameter portion;

wherein step (b) includes defining a flared end of the valve body, the distance between the flared end and the means for rotating being equal to the distance between the first end of the pipe and the transverse hole; and wherein step (c) includes inserting the valve assembly into the first end of the pipe bore until the flared end abuts the first end to longitudinally align the means for rotating with the transverse hole.

10. A method for assembling a drain valve, the method comprising:

(a) providing a pipe that includes first and second opposite ends, a pipe bore extending from the first end to the second end, and a transverse hole extending through a side of the pipe and communicating with the pipe bore;

(b) providing a valve assembly comprising a body having a body bore, and a rotatable mechanism within the body and having a mechanism bore and means for rotating the rotatable mechanism, the rotatable mechanism being rotatable via the means for rotating within the body to selectively align and misalign the mechanism bore with respect to the body bore;

(c) inserting the valve assembly into the pipe bore with the means for rotating being accessible through the transverse hole; and (d) forming a first reduced diameter portion in the pipe bore to create a substantially water-tight seal between a portion of the valve assembly and the first reduced diameter portion;

wherein step (b) includes providing a plurality of ribs on an external surface of the valve body;

and wherein step (c) includes creating a press-fit interconnection between the pipe and the valve body through the ribs to hold the valve body in place during step (d).

11. A method for assembling a drain valve, the method comprising:

(a) providing a pipe that includes first and second opposite ends, a pipe bore extending from the first end to the second end, and a transverse hole extending through a side of the pipe and communicating with the pipe bore;

(b) providing a valve assembly comprising a body having a body bore, and a rotatable mechanism within the body and having a mechanism bore and means for rotating the rotatable mechanism, the rotatable mechanism being rotatable via the means for rotating within the body to selectively align and misalign the mechanism bore with respect to the body bore;

(c) inserting the valve assembly into the pipe bore with the means for rotating being accessible through the transverse hole; and (d) forming a first reduced diameter portion in the pipe bore to create a substantially water-tight seal between a portion of the valve assembly and the first reduced diameter portion;

wherein step (b) includes providing a modular valve assembly that is operable for permitting and restricting fluid flow through the body bore without regard to whether the valve assembly is within the pipe.

12. A drain valve comprising:

a pipe including a cylindrical pipe wall having interior and exterior surfaces and first and second opposite ends, the interior surface of the pipe wall defining a pipe bore extending between the first and second ends, and a transverse hole in the pipe wall extending from the exterior surface to the interior surface and communicating with the pipe bore; and a valve assembly within the pipe bore, the valve assembly comprising a body and a rotatable mechanism within the body, the body defining a body bore and the rotatable mechanism defining a mechanism bore, the rotatable mechanism being rotatable to selectively align and misalign the mechanism bore with respect to the body bore;

wherein the rotatable mechanism is aligned with the transverse hole in the pipe to enable rotating of the rotatable mechanism through the transverse hole;

wherein the pipe bore includes a first reduced diameter portion applying a compressive force against a portion of the valve body to create a water-tight seal therebetween; and wherein the pipe bore and the body bore have longitudinal axes that are not collinear with respect to each other.

13. The drain valve of claim 12, wherein the rotatable mechanism includes a tool interface accessible with a tool through the transverse hole to engage and rotate the means for rotating.

14. The drain valve of claim 12, wherein the exterior surface of the pipe wall includes tapered pipe threads on the first end and standard hose threads on the second end.

15. The drain valve of claim 12, further comprising a second reduced diameter portion in the pipe bore providing a thrust bearing surface against which a portion of the valve assembly abuts to resist sliding movement of the valve assembly toward the second end.

16. The drain valve of claim 12, wherein the valve assembly includes a sealing member around a portion of the valve body; and wherein the first reduced diameter portion applies a compressive force against the sealing member.

17. The drain valve of claim 12, wherein the valve assembly includes a seal member mounted on and rotatable with the rotatable mechanism.

18. The drain valve of claim 12, wherein the pipe is constructed of a metal material and the valve body is constructed of a dielectric material.

19. The drain valve of claim 12, further comprising a sealant material on an outer surface of the valve body against which the first reduced portion applies the compressive force, the sealant material assisting in creating the water-tight seal.

20. A drain valve comprising:

a pipe including a cylindrical pipe wall having interior and exterior surfaces and first and second opposite ends, the interior surface of the pipe wall defining a pipe bore extending between the first and second ends, and a transverse hole in the pipe wall extending from the exterior surface to the interior surface and communicating with the pipe bore; and a valve assembly within the pipe bore, the valve assembly comprising a body and a rotatable mechanism within the body, the body defining a body bore and the rotatable mechanism defining a mechanism bore, the rotatable mechanism being rotatable to selectively align and misalign the mechanism bore with respect to the body bore;

wherein the rotatable mechanism is aligned with the transverse hole in the pipe to enable rotating of the rotatable mechanism through the transverse hole; and wherein the pipe bore includes a first reduced diameter portion applying a compressive force against a portion of the valve body to create a water-tight seal therebetween;

wherein the rotatable mechanism includes a curved surface having a recess, and a seal having a curved shape complimentary to the shape of the curved surface; wherein the seal fits within the recess such that upon rotation of the rotating mechanism, the seal slides past the body bore without catching on the valve body; and wherein the seal includes a ring portion and a straight portion extending substantially diametrically across the ring portion, wherein the straight portion is compressed when inserted in the recess to create a press-fit interconnection to retain the seal within the recess.

21. A drain valve comprising:

a pipe including a cylindrical pipe wall having interior and exterior surfaces and first and second opposite ends, the interior surface of the pipe wall defining a pipe bore extending between the first and second ends, and a transverse hole in the pipe wall extending from the exterior surface to the interior surface and communicating with the pipe bore; and a valve assembly within the pipe bore, the valve assembly comprising a body and a rotatable mechanism within the body, the body defining a body bore and the rotatable mechanism defining a mechanism bore, the rotatable mechanism being rotatable to selectively align and misalign the mechanism bore with respect to the body bore;

wherein the rotatable mechanism is aligned with the transverse hole in the pipe to enable rotating of the rotatable mechanism through the transverse hole;

wherein the pipe bore includes a first reduced diameter portion applying a compressive force against a portion of the valve body to create a water-tight seal therebetween; and wherein the valve assembly is operable as a valve for permitting and restricting fluid flow through the body bore without regard to whether the valve assembly is within the pipe.

* * * * *